United States Patent
Sano

(10) Patent No.: US 9,594,192 B2
(45) Date of Patent: Mar. 14, 2017

(54) OPTICAL ELEMENT, OPTICAL SYSTEM, AND METHOD OF MANUFACTURING OPTICAL ELEMENT

(71) Applicant: CANON KABUSHIKI KAISHA, Tokyo (JP)

(72) Inventor: Daisuke Sano, Moka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/642,984

(22) Filed: Mar. 10, 2015

(65) Prior Publication Data

US 2015/0253467 A1    Sep. 10, 2015

(30) Foreign Application Priority Data

Mar. 10, 2014   (JP) ................. 2014-046107

(51) Int. Cl.
| | |
|---|---|
| G02B 1/00 | (2006.01) |
| G02B 1/14 | (2015.01) |
| G02B 5/00 | (2006.01) |
| G02B 3/00 | (2006.01) |
| G02B 13/06 | (2006.01) |
| G02B 27/00 | (2006.01) |

(52) U.S. Cl.
CPC .............. *G02B 1/14* (2015.01); *G02B 5/003* (2013.01); *G02B 3/00* (2013.01); *G02B 13/06* (2013.01); *G02B 27/0018* (2013.01)

(58) Field of Classification Search
CPC ............ G02B 1/105; G02B 1/14; G02B 1/18; G02B 3/00

USPC ......................................... 359/642, 738, 739
See application file for complete search history.

(56) References Cited

U.S. PATENT DOCUMENTS

| | | | | |
|---|---|---|---|---|
| 7,278,738 B2 * | 10/2007 | Hsu | ............... | G02B 1/11 351/159.62 |
| 2002/0126400 A1 * | 9/2002 | Muller-Rissmann | | G03F 7/70058 359/820 |
| 2009/0185291 A1 * | 7/2009 | Tsuchiya | ............... | G02B 7/021 359/738 |
| 2013/0016430 A1 * | 1/2013 | Ogawa | ............... | G02B 1/11 359/614 |
| 2013/0250404 A1 * | 9/2013 | Yang | ............... | G02B 3/00 359/356 |

FOREIGN PATENT DOCUMENTS

| | | |
|---|---|---|
| JP | 2010-054827 A | 3/2010 |
| JP | 2011-164494 A | 8/2011 |
| JP | 2012-246373 A | 12/2012 |
| JP | 2013-100456 A | 5/2013 |

* cited by examiner

*Primary Examiner* — Darryl J Collins
(74) *Attorney, Agent, or Firm* — Rossi, Kimms & McDowell LLP

(57) ABSTRACT

Provided is an optical element, including optical glass as a base material and having an optical surface and a non-optical surface. In the optical element, the optical glass has a Knoop hardness of 600 N/mm$^2$ or more, and the non-optical surface has a coating film layer formed thereon, the coating film layer containing a pigment as a color material and having a refractive index of 1.65 or more.

5 Claims, 2 Drawing Sheets

OPTICAL ELEMENT, OPTICAL SYSTEM, AND METHOD OF MANUFACTURING OPTICAL ELEMENT

BACKGROUND OF THE INVENTION

Field of the Invention

The present invention relates to an optical element, an optical system, and a method of manufacturing an optical element.

Description of the Related Art

In many optical apparatus, optical elements having various effects are used. For example, an optical lens as an optical element used in a camera or the like has effects of refracting and condensing or diverging incident light. On the other hand, a prism as an optical element used in a microscope or a projector has effects of transmitting and refracting incident light to control an optical path.

Each of the optical elements has an optical surface (active surface) that exerts an action on the incident light, and a non-optical surface (inactive surface) that does not act on the light. For example, the lens has a refractive surface for refracting the incident light, as well as a holding surface for mechanically holding the lens. The former is the optical surface (active surface), and the latter is the non-optical surface (inactive surface).

Hitherto, the non-optical surface (inactive surface) is generally coated with a light blocking coating in order not to exert an unnecessary action on the light. This is for avoiding light that has been reflected or scattered in an optical system or the optical apparatus from impinging on the non-optical surface (inactive surface) and exerting the unnecessary action as stray light.

In Japanese Patent Application Laid-Open No. 2010-54827, there is a disclosure that, in the optical element in which the sub-wavelength structure is formed in the section where the light beam is effective, the opaque coating film layer is formed in the section where the light beam not effective (inactive surface), and the protective film having the different component is formed on the coating film layer. This solves the problem in that, in the case where the processing of the optical element includes the step of immersing in the hot water, and in the case where the components such as the black dye and the like are resolved from the opaque coating film layer, the inner reflection of the coating film layer is deteriorated, and at the same time, the section where the light beam is effective becomes polluted. In other words, the protective film having the different component may be formed to avoid the opaque coating from being brought into direct contact with the hot water and hence avoid the resolution of the components.

However, in Japanese Patent Application Laid-Open No. 2010-54827, the protective film is formed on the coating film layer so that the coating film layer becomes a multilayer structure, and in the case where a heat process or the like is applied to the optical element, local concentration of stress inside the film is prone to occur due to a difference in thermal expansion coefficient. The local concentration of the stress causes the coating film layer to peel off the section where the light beam is not effective, and an air gap is formed in the part in which the coating film layer has peeled off, which appears as a white reflection when the optical element is viewed from an optical axis direction. In other words, the coating film layer, which originally is opaque and appears to be black, appears to have white spots emerging inside, which is not preferred in terms of quality of appearance.

SUMMARY OF THE INVENTION

It is an object of the present invention to provide an optical element and an optical system in which, in a case where optical glass as a base material has a high hardness, quality of appearance of a non-optical surface, which is visible through an optical surface, improved with a simple configuration, and a method of manufacturing an optical element.

In order to attain the above-mentioned object, according to one embodiment of the present invention, there is provided an optical element, including optical glass as a base material and having an optical surface and a non-optical surface, in which the optical glass has a Knoop hardness of 600 N/mm$^2$ or more, and the non-optical surface has a coating film layer formed thereon, the coating film layer containing a pigment as a color material and having a refractive index of 1.65 or more.

Further, according to one embodiment of the present invention, there is provided an optical system, including a plurality of optical elements arranged in an optical axis direction, in which the optical system has an optical surface and a non-optical surface, the optical surface and the non-optical surface containing optical glass as a base material, the optical glass has a Knoop hardness of 600 N/mm$^2$ or more, and the non-optical surface has a coating film layer formed thereon, the coating film layer containing a pigment as a color material and having a refractive index of 1.65 or more.

Further, according to one embodiment of the present invention, there is provided a method of manufacturing an optical element containing optical glass having a Knoop hardness of 600 N/mm$^2$ or more as a base material, the method including: forming a first optical surface by optical polishing; forming a second optical surface by the optical polishing; and forming, on a non-optical surface that is visible through one of the first optical surface and the second optical surface, a coating film layer containing a pigment as a color material and having a refractive index of 1.65 or more.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the drawings.

First Embodiment

Optical Element

Figure 1:
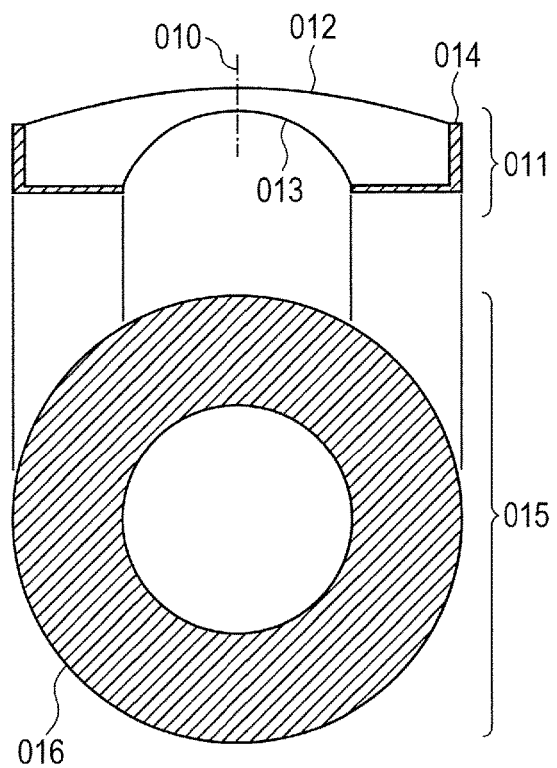
FIG. 1 is a cross-sectional view and a top view of an optical element according to a first embodiment of the present invention.

FIG. 1 is a schematic view of an optical element 011 according to a first embodiment of the present invention.

1) Optical Surface and Non-Optical Surface

In FIG. 1, the optical element 011 is a transmission optical lens, and has a first optical surface 012 and a second optical surface 013 each having a tangent plane that is orthogonal to an optical axis 010, and a non-optical surface 014. Note that, a diagonally shaded region 016 in a top view 015 of the optical element 011 in FIG. 1 is the non-optical surface.

The term "optical surface" as used herein refers to an optically polished smooth surface, and to a surface having actions of transmitting and refracting incident light. On the other hand, the term "non-optical surface" refers to a surface having a roughness of a wavelength of light or larger in order to avoid the actions of transmitting and refracting the incident light. In other words, the optical surface a surface that uses the incident light, and the non-optical surface is a surface that does not use the incident light.

2) Knoop Hardness

The optical element 011 in this embodiment contains optical glass having a Knoop hardness of 600 N/mm$^2$ or more as a base material (substrate) to resist scratches. In such optical element 011 containing the optical glass having the Knoop hardness of 600 N/mm$^2$ or more as the base material (substrate), cracks of about several μm to several tens of μm are prone to occur in machining and polishing due to the high hardness. In particular, cracks are more likely to occur in machining such a rough surface as the non-optical surface 014 than in forming such smooth surfaces as the optical surfaces 012 and 013.

It is a general practice to form a coating film layer on such non-optical surface 014 with remaining cracks in order to effectively absorb the incident light, thereby avoiding reflection and transmission. Here, when a conventionally-used coating film layer is formed on the optical element 011 containing the optical glass having the Knoop hardness of 600 N/mm$^2$ or more as the base material (substrate), a phenomenon in which the coating film layer peels off the crack part due to internal stress of the coating film layer is observed. This phenomenon is more likely to occur as the stress concentration in the coating film layer is larger.

3) Coating Film Layer

3-1) Coating Film Layer in this Embodiment

In this embodiment, the non-optical surface 014 is coated with a coating film layer, which contains a pigment as a color material, as a coating film layer compatible with the optical glass having the Knoop hardness of 600 N/mm$^2$ or more. Coloring matter of the pigment is insoluble in a material such as a solvent or a resin, and exists like particulates independent of other materials. Therefore, movements of the components in the coating film layer hardly occur, and the components do not change with changes in environment. Moreover, the pigment is also insoluble in water, and hence even when a process of immersing in hot water or the like is applied after forming the coating film layer, elution of the coloring matter components does not occur.

Further, in this embodiment, the coating film layer having a refractive index of 1.65 or more is used. When the refractive index of the coating film layer is 1.65 or more, the light path length of internal part of the coating film layer becomes relatively long. Thus, a sufficient light absorption property may be obtained even in the case of a thin coating film layer. The refractive index is more preferably 1.67 or more, still more preferably 1.70 or more.

In addition, it is preferred that such coating film layer include a material having a high refractive index of 1.70 or more in addition to the pigment and the binder resin, and include particles of 500 nm or larger at a weight ratio of 5% or more. Thus, visible light is efficiently scattered in the internal part of the coating film layer to improve its absorption property. In addition, the refractive index of the coating film layer may also be improved.

3-2) Comparative Example

Here, in the case where the coating film layer containing a dye as the color material is used for an optical element 011 containing the optical glass having the Knoop hardness of 600 N/mm$^2$ or more as the base material (substrate), the coloring matter is resolved and dispersed in a binder resin or the like. The coloring matter of the dye has good resolvability and aggregability, and hence concentration of the coloring matter is prone to occur due to effects of heat and water. Such concentration generates a density distribution in the coating film layer, and is likely to lead to the stress concentration in the coating film layer. When the stress concentration occurs in the coating film layer formed on the non-optical surface 014, the coating film layer is prone to peel off the crack part.

In the part in which the coating film layer has peeled off, an air gap is disadvantageously formed at an interface with the non-optical surface 014. The air gap appears as white reflection when the optical element 011 is viewed from the optical surface 012 side. The opaque coating film layer is formed on the non-optical surface 014, and hence white spots appear to emerge in the region 016 of the non-optical surface, which appears to be black (FIG. 1). This is not preferred in terms of quality of appearance.

4) Proportion of Non-Optical Surface (Orthogonal Projection in Optical Axis Direction)

In this embodiment, as compared to a first region obtained by orthogonally projecting the first optical surface 012 in an optical axis direction, a second region obtained by orthogonally projecting the second optical surface 013 in the optical axis direction smaller. Further, a third region obtained by orthogonally projecting the non-optical surface in the optical axis direction is within the first region and outside the second region.

In this embodiment, an area ratio of the third region to the first region is 30% or more. This indicates that, in the top view 015 of the optical element 011, an area of the shaded region 016 of the non-optical surface 014 accounts for 30% or more. If this condition satisfied, when the optical element 011 is viewed from immediately above on the optical surface 012 side, a directly visible range of the non-optical surface 014 becomes large.

5) Antireflection Film Formed in Optical Surface

An antireflection film is typically formed in the optical surface 012 or 013 in order to efficiently transmit incoming light. In the antireflection film, a vapor deposition method, which is a kind of the vacuum film forming method, a method utilizing a petal-like thin film, and the like are known. The vapor deposition method is a technique involving vaporizing a source for forming a film at a vacuum state by heat or plasma process, and forming a film by depositing the material on a substrate.

On the other hand, the petal-like thin film is obtained by sintering an aluminum oxide or aluminum thin-film layer (Step 4 in the following method of manufacturing an optical element) at a high temperature of 120° C. or more for 20 minutes or more (Step 5 in the following method of manufacturing an optical element), and immersing the resultant in hot water at 70° C. or more for 10 minutes or more (Step 7 in the following method of manufacturing an optical element).

The petal-like thin film thus obtained has a structure in which petals of aluminum oxide or aluminum are randomly placed at an interval equal to or less than the wavelength of visible light. Such structure shows a similar behavior to that of a thin film having a refractive index according to the volume ratio between the materials for forming the structure. Thus, the petal-like thin film shows a similar behavior to that of a film having an extremely low refractive index. Accordingly, the petal-like thin film is suitable to use as an antireflection film.

Method of Manufacturing Optical Element

A method of manufacturing an optical element in this embodiment includes a step of forming the first optical surface by the optical polishing with the optical glass having the Knoop hardness of 600 N/mm² or more as the base material (hereinafter referred to as "Step 1"). The manufacturing method also includes a step of forming the second optical surface by the optical polishing (hereinafter referred to as "Step 1"). The manufacturing method further includes a step of forming, on the non-optical surface which is visible through the first or second optical surface, the coating film layer containing the pigment as the color material and having a refractive index of 1.65 or more (hereinafter referred to as "Step 3").

In addition, the method of manufacturing an optical element in this embodiment involves a step of subjecting the optical element 011 to a heat process of 120° C. or more for 20 minutes or more (hereinafter referred to as "Step 6") after forming a coating film layer on the device. The manufacturing method also includes a step of subjecting the optical element to a process of immersing in hot water of 70° C. or more for 10 minutes or more (hereinafter referred to as "Step 7") after forming a coating film layer on the device. In the first place, those processes are processes that are not preferred in terms of quality of appearance because of causing, for example, concentration or elution of the components in the internal part of the coating film layer. However, in this embodiment, those processes can prevent the coating film layer to peel off, and the components to elute.

In addition, as a more preferred embodiment, the method of manufacturing an optical element in this embodiment includes at least one of the following steps, i.e., includes a step of subjecting the non-optical surface to surface roughening machining (hereinafter referred to as "Step 2") before the step of forming the coating film layer, includes a step of forming a film containing one of aluminum and aluminum oxide on the first optical surface and the second optical surface (hereinafter referred to as "Step 4") after the step of forming the coating film layer on the non-optical surface, and includes a step of sintering under an atmosphere of a temperature of from 80° C. to 300° C. (hereinafter referred to as "Step 5").

The order of the steps are, for example, as follows.
Step 1) the optical polishing of the optical surface
Step 2) the surface roughening machining of the non-optical surface
Step 3) the forming of a coating film layer on the non-optical surface
Step 4) the forming of a film containing one of aluminum and aluminum oxide on the optical surface
Step 5) the sintering under a predetermined temperature atmosphere
Step 6) the heat process
Step 7) the immersing in hot water Effect of this Embodiment As described above, according to this embodiment, a related-art protective film may become unnecessary by forming the coating film layer containing the pigment as the color material and having the refractive index of 1.65 or more on the non-optical surface of the optical element in which the optical glass as the base material has the Knoop hardness of 600 N/mm² or more. Thus, the following problem is overcome: as in the example of related-art, in the case where a heat process or the like is applied to the optical element, local concentration of stress inside the film is prone to occur due to a difference in thermal expansion coefficient. Accordingly, the quality of appearance of the non-optical surface, which is present at a highly visible part, may be improved through the simple construction.

Second Embodiment

Figure 2:
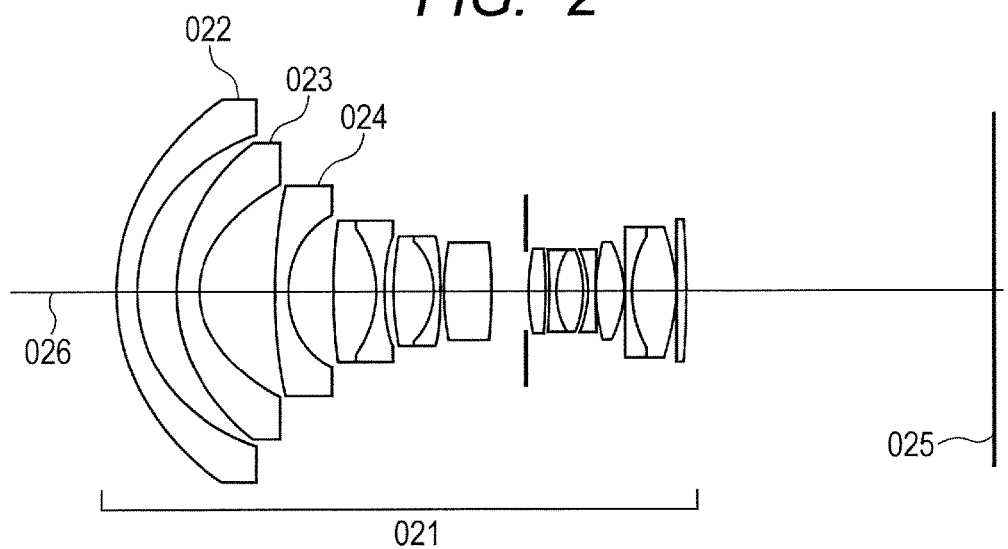
FIG. 2 is a cross-sectional view of an optical system according to a second embodiment of the present invention.

FIG. 2 illustrates an example of an image pickup optical system as an optical system according to a second embodiment of the present invention. In FIG. 2, the image pickup optical system is denoted by 021, optical elements made of optical glass are denoted by 022, 023, and 024, an image pickup surface is denoted by 025, and an optical axis of the image pickup optical system 021 is denoted by 026. The left side of the sheet is an object side, and the right side is an image side. Each of the optical elements 022, 023, and 024 is a transmission optical lens in which two surfaces orthogonal to the optical axis 026 face each other.

The optical element 022 is made of optical glass S-LAH66, which is manufactured by OHARA INC., and has a Knoop hardness of 700 N/mm². On the other hand, the optical elements 023 and 024 are made of optical glass L-BAL42, which is manufactured by OHARA INC., and has a Knoop hardness of 590 N/mm². Therefore, the optical element 022 satisfies the condition described in the first embodiment, and the optical elements 023 and 024 do not satisfy the condition described in the first embodiment.

In this embodiment, as opposed to the optical elements 023 and 024, the optical element 022 has a possibility of being brought into contact with the outside, and hence hard optical glass having the Knoop hardness of 600 N/mm² or more is used in order not to generate scratches and the like.

In the optical system including a plurality of optical lenses according to this embodiment, in a case where any one of the optical lenses contains the optical glass having the Knoop hardness of 600 N/mm² or more, which is described in the first embodiment, and has the first and second optical surfaces and the non-optical surface, the present invention may also be practiced.

Here, FIG. 2 illustrates a case where the optical lens having the non-optical surface and containing the optical glass having the Knoop hardness of 600 N/mm² or more is an optical lens closest to the object side. In general, in a case where the non-optical surface is formed on the optical lens that is located at a position satisfying the following condition and contains the optical glass having the Knoop hardness of 600 N/mm² or more, the non-optical surface is visible through lenses or directly from the optical axis direction.

More specifically, in an optical system using a number N of transmission optical lenses, a smallest diameter in an optical surface of the optical lens that is positioned m-th from the object side is represented by $A_m$. Then, the non-optical surface is formed on the m-th optical lens from the object side, which satisfies any one of the following conditional expressions (1), (2), and (3). In this case, the non-optical surface described above is visible from the optical axis direction.

$$A_m > A_{m+1} \text{ (where } m=1,2,\ldots m) \quad (1),$$

or $$A_m < A_{m+1} \text{ (where an integer } m=m,m+1,\ldots N-1) \quad (2),$$

or $$m=1 \text{ or } N \quad (3).$$

Figure 3A:
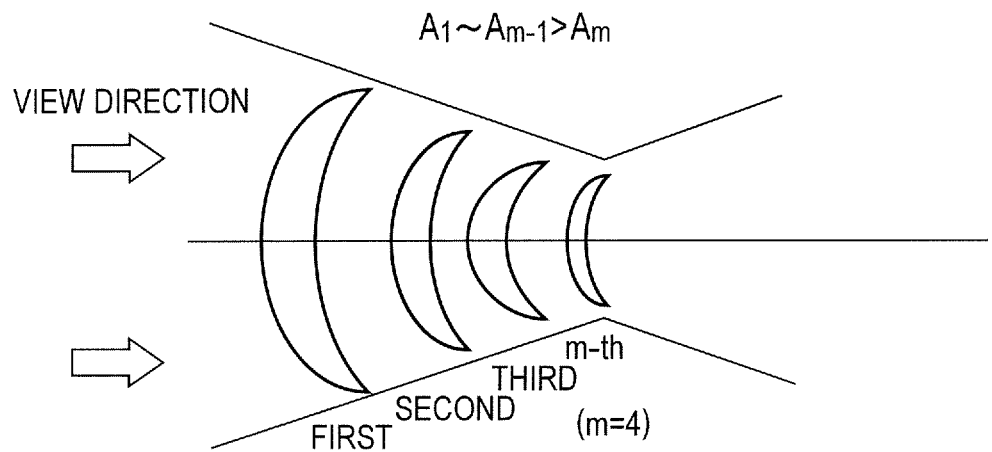
FIG. 3A is an explanatory view on positions of optical elements according to the second embodiment of the present invention.
Figure 3B:
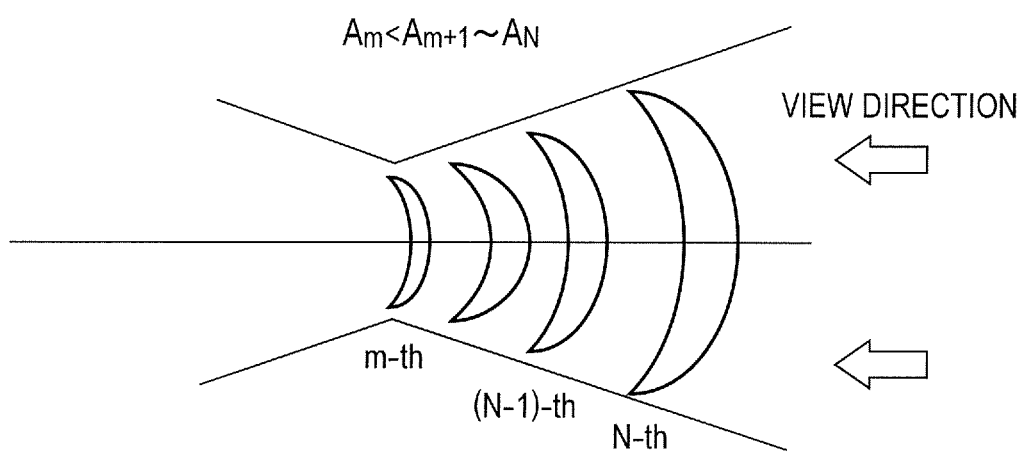
FIG. 3B is an explanatory view on positions of the optical elements according to the second embodiment of the present invention.

Here, a case where the conditional expression (1) is satisfied is illustrated in FIG. 3A, and a case where the conditional expression (2) is satisfied is illustrated in FIG. 3B.

Note that, a case where m=1 in the conditional expression (3) is the case illustrated in FIG. 2, and in a case where a diameter of the first optical surface is larger than a diameter of the second optical surface, the non-optical surface that is radially outside the second optical surface is visible through the first optical surface from the object side. Note that, in a case where the diameter of the first optical surface is smaller than the diameter of the second optical surface, the non-optical surface that is radially outside the first optical surface is directly visible.

On the other hand, in a case where m=N in the conditional expression (3), and in a case where a diameter of an optical surface on the object side of the final lens is smaller than a diameter of an optical surface on the image side, the non-optical surface that is radially outside the optical surface on the object side is visible through the optical surface on the image side from the image side. Note that, in a case where the diameter of the optical surface on the object side of the final lens is larger than the diameter of the optical surface on the image side, the non-optical surface that is radially outside the optical surface on the image side is directly visible.

In FIG. 2, an area of the non-optical surface accounts for about 35% of the orthogonal projection of the optical element 022 in the optical axis direction. The coating film layer described in the first embodiment may be formed on such non-optical surface (non-optical surface of the optical lens containing the optical glass having the Knoop hardness of 600 N/mm² or more) to avoid generation of a white spot pattern due to peeling off of the coating film layer.

Modified Examples

The exemplary embodiments of the present invention are described above, but the present invention is not limited to those embodiments and can be modified and changed variously within the scope of the gist thereof.

Modified Example 1

In the above-mentioned embodiments, it is presupposed that the optical surface includes a first optical surface, and a second optical surface having, as an orthogonal projection region, a second region having an area that is smaller than a first region obtained by orthogonally projecting the first optical surface in an optical axis direction. Further, the non-optical surface has, as an orthogonal projection region, a third region inside the first region and outside the second region. However, the present invention is not limited to the above-mentioned embodiments.

For example, it may be presupposed that the optical surface includes a first optical surface, and a second optical surface that is decentered with respect to the first optical surface and has, as an orthogonal projection region, a second region having the same area as a first region obtained by orthogonally projecting the first optical surface in an optical axis direction. In this case, the non-optical surface has, as an orthogonal projection region, a third region inside the first region and outside the second region that is decentered with respect to the first region.

Modified Example 2

In the second embodiment described above, the first and second optical surfaces are lens surfaces of the same optical lens. However, the present invention is not limited thereto, and may be applied to a case where the first and second optical surfaces are lens surfaces of different optical lenses (in this case, the non-optical surface is formed on the optical lens containing the optical glass having the Knoop hardness of 600 N/mm² or more).

Moreover, the first and second optical surfaces and the non-optical surface may be formed on mutually different optical lenses (in this case, the non-optical surface is formed on the optical lens containing the optical glass having the Knoop hardness of 600 N/mm² or more).

Modified Example 3

In the first and second embodiments described above, the optical element is a transmission lens. However, the present invention is not limited thereto, and the optical element may be a reflection lens. In other words, in the first embodiment, the first optical surface may be a transmission surface (lens surface), and the second optical surface may be a reflection surface (mirror surface).

Moreover, in the second embodiment, the optical system including the plurality of optical elements arranged in the optical axis direction may include a transmission lens and a reflection lens as the plurality of optical elements.

Here, in any case, the non-optical surface is formed on the optical lens containing the optical glass having the Knoop hardness of 600 N/mm² or more, and the coating film layer containing the pigment as the color material and having the refractive index of 1.65 or more is formed on the non-optical surface.

Modified Example 4

Moreover, in the embodiments described above, the case where the non-optical surface (formed on the optical lens containing the optical glass having the Knoop hardness of 600 N/mm² or more) is formed in a region that is orthogonal to the optical axis 010 in FIG. 1 (corresponding to the region 016 of FIG. 1), and a region along the optical axis 010 has been exemplified. However, the present invention is not limited thereto, and the non-optical surface (formed on the optical lens containing the optical glass having the Knoop hardness of 600 N/mm² or more) may be formed at least in the region that is orthogonal to the optical axis 010.

In this case, on the non-optical surface (formed on the optical lens containing the optical glass having the Knoop hardness of 600 N/mm² or more) formed in the region that is orthogonal to the optical axis 010, the coating film layer (coating film layer containing the pigment as the color material and having the refractive index of 1.65 or more) described above is formed. Then, on the non-optical surface formed in the region along the optical axis 010, a coating film layer that is different from the coating film layer (coating film layer containing the pigment as the color material and having the refractive index of 1.65 or more) described above may be formed.

Modified Example 5

Moreover, in the embodiments described above, the non-optical surface (formed on the optical lens containing the optical glass having the Knoop hardness of 600 N/mm² or more) is provided in one place in the optical system as illustrated in FIG. 2. However, the present invention is not limited thereto, and the coating film layer (coating film layer containing the pigment as the color material and having the refractive index of 1.65 or more) described above may be formed on each of a plurality of non-optical surfaces (formed on a plurality of optical lenses each containing the optical glass having the Knoop hardness of 600 N/mm² or more).

Modified Example 6

Moreover, in the embodiments described above, the optical lens has been described as the optical element, but the optical element may be a prism, a diffractive optical element, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-046107, filed Mar. 10, 2014, which is hereby incorporated by reference herein in its entirety.

What is claimed is:

1. An optical system, comprising:
a plurality of optical elements arranged in an optical axis direction; and
an optical surface and a non-optical surface, the optical surface and the non-optical surface containing optical glass as a base material,
wherein the optical glass has a Knoop hardness of 600 N/mm² or more,
wherein the non-optical surface has a coating film layer formed thereon, the coating film layer containing a pigment as a color material and having a refractive index of 1.65 or more, and
wherein the optical system satisfies any one of the following conditions:

$A_m < A_k$; where $1 < m < N$ and for any $k$ satisfying $1 \le k \le m-1$;

$A_m < A_k$; where $1 < m < N$ and for any $k$ satisfying $m+1 \le k \le N$;

$m=1$; or $m=N$, where N represents a number of the plurality of optical elements, m represents an order from an object side of an optical element having the non-optical surface among the plurality of optical elements and $A_i$ (i= 1, ..., N) represents a smallest diameter of the optical surface of the i-th optical element from the object side.

2. An optical system according to claim 1,
wherein the optical surface comprises first and second optical surfaces, and
wherein a third region overlaps with a first region, whereas the third region does not overlap with a second region, the first, second, and third regions being orthogonal projection regions obtained by orthogonally projecting the first and second optical surfaces and the non-optical surface in an optical axis direction, respectively.

3. An optical system according to claim 1,
wherein the optical surface comprises a first optical surface, and a second optical surface that is decentered with respect to the first optical surface and has, as an orthogonal projection region, a second region having the same area as a first region obtained by orthogonally projecting the first optical surface in an optical axis direction, and
wherein the non-optical surface has, as an orthogonal projection region, a third region inside the first region and outside the second region that is decentered with respect to the first region.

4. An optical system according to claim 1, wherein an area ratio of an orthogonal projection of the non-optical surface in an optical axis direction to an orthogonal projection of the optical surface in the optical axis direction is 30% or more.

5. An optical system according to claim 1, wherein the coating film layer contains particles of 500 nm or larger in a weight ratio of 5% or more.

* * * * *